(12) United States Patent
Koch

(10) Patent No.: US 10,700,376 B2
(45) Date of Patent: Jun. 30, 2020

(54) METHODS FOR FAST-CHARGING AND DETECTING LITHIUM PLATING IN LITHIUM ION BATTERIES

(71) Applicant: GM GLOBAL TECHNOLOGY OPERATIONS LLC, Detroit, MI (US)

(72) Inventor: Brian J. Koch, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 15/664,704

(22) Filed: Jul. 31, 2017

(65) Prior Publication Data

US 2019/0031035 A1 Jan. 31, 2019

(51) Int. Cl.

| | | |
|---|---|---|
| *H01M 10/0525* | (2010.01) | |
| *B60L 53/00* | (2019.01) | |
| *B60L 58/10* | (2019.01) | |
| *H01M 10/48* | (2006.01) | |
| *H02J 7/00* | (2006.01) | |
| *H01M 10/44* | (2006.01) | |
| *H01M 10/052* | (2010.01) | |
| *H01M 10/42* | (2006.01) | |

(52) U.S. Cl.
CPC ......... *H01M 10/0525* (2013.01); *B60L 53/00* (2019.02); *B60L 58/10* (2019.02); *H01M 10/44* (2013.01); *H01M 10/48* (2013.01); *H02J 7/00* (2013.01); *B60L 2240/547* (2013.01); *B60L 2240/549* (2013.01); *B60L 2240/80* (2013.01); *H01M 10/052* (2013.01); *H01M 10/4257* (2013.01); *H01M 2010/4278* (2013.01); *H01M 2220/20* (2013.01)

(58) Field of Classification Search
CPC ... H01M 2010/4278; H01M 2004/027; H01M 2004/028; H01M 10/448; H01M 10/446
See application file for complete search history.

*Primary Examiner* — Ladan Mohaddes

(57) ABSTRACT

Methods for fast-charging batteries while minimizing lithium plating (LP) comprise charging the battery in a first phase at a near-maximum charging current, subsequently charging the battery in a second phase by decreasing the charging current while charging in order to maintain the anode potential equal to or above an anode potential threshold, and subsequently charging the battery in a third phase at constant cell potential such that the cathode potential remains below a cathode potential threshold. LP can be detected by determining the derivative of the charging current and examining the derivative for smooth curves or local discontinuities, wherein a smooth curve indicates the absence of LP and a curve with a local discontinuity indicates the presence of LP. A fast-charging profile can be defined by plotting the cell potential vs. the charging current from the first phase, the second phase, and the third phase to define a fast-charging profile.

10 Claims, 6 Drawing Sheets

METHODS FOR FAST-CHARGING AND DETECTING LITHIUM PLATING IN LITHIUM ION BATTERIES

BACKGROUND

Lithium ion batteries describe a class of rechargeable batteries in which lithium ions move between a negative electrode (i.e., anode) and a positive electrode (i.e., cathode). Liquid and polymer electrolytes can facilitate the movement of lithium ions between the anode and cathode. Lithium-ion batteries are growing in popularity for defense, automotive, and aerospace applications due to their high energy density and ability to undergo successive charge and discharge cycles.

Lithium-based batteries are finding increasing usage in powering electric motors and other devices in automobiles and in powering other consumer devices. High energy-capacity lithium-ion batteries are required for use in powering electric motors for driving the wheels of an automobile, and in many such applications a multi-cell, high voltage, lithium-ion battery is used. The use of such batteries in such applications requires that the electrochemical cells of the battery are continually discharged and re-charged.

SUMMARY

Methods for fast-charging lithium batteries are provided. Lithium batteries can include an anode, a cathode electrically connected to the anode via a circuit, and a lithium ion-containing electrolyte in contact with the anode and the cathode. The batteries can be charged by directing current from a power supply to the circuit. The methods can include charging the battery in a first phase at a near-maximum charging current, subsequently charging the battery in a second phase by decreasing the charging current while charging in order to maintain the anode potential equal to or above an anode potential threshold, and subsequently charging the battery in a third phase such that the cathode potential remains below a cathode potential threshold. The near-maximum charging current can be determined by the limitations of the battery hardware and/or the external charging hardware. During the second phase the anode potential can remain substantially constant close to, but not below, the minimum anode potential threshold. The first phase can end when the anode potential reaches the anode potential threshold. The second phase can end when the cell potential reaches a maximum cell potential threshold. The cell potential can remain substantially constant during the third phase. The charging current can be decreased while charging during the third phase such that the cathode potential remains close to, but not above, the cathode potential threshold. The method can further include subsequently ending battery charging when the charging current reaches a minimum value and maintaining the battery in an open-circuit state in a fourth phase. The method can further include determining the minimum anode potential threshold by first measuring the charging current during one or more of the second phase or the third phase, determining the derivative of the measured charging current with respect to time, and examining the derivative data over the second phase and/or the third phase to determine whether the derivative data presents a smooth curve or a curve with a local discontinuity. A smooth curve can indicate the absence of lithium plating and a curve with a local discontinuity can indicate the presence of lithium plating, and second iteratively implementing the battery charging method using a higher anode potential threshold than the previous iteration if lithium plating occurred during the previous iteration or using a lower anode potential threshold than the previous iteration if no lithium plating occurred during the previous iteration. The method can further include measuring the potential of a characteristic of the battery, determining the derivative of the measured potential with respect to time or charge, and examining the derivative data over the first phase, the third phase, and/or the fourth phase. The measured potential of a characteristic of the battery can be one or more of the anode potential, the cathode potential, and/or the cell potential.

Methods for determining whether lithium plating occurs while charging a battery are provided. Batteries can include an anode, a cathode electrically connected to the anode via a circuit, and a lithium ion-containing electrolyte in contact with the anode and the cathode. Batteries can be charged by directing current from a power supply to the circuit. The methods can include charging the battery in a first phase at a near-maximum charging current, subsequently charging the battery in a second phase by decreasing the charging current while charging in order to maintain the anode potential equal to or above an anode potential threshold, subsequently charging the battery in a third phase such that the cathode potential remains below a cathode potential threshold, optionally subsequently ending battery charging when the charging current reaches a minimum value and maintaining the battery in an open-circuit state in a fourth phase, measuring the charging current during one or more of the second phase and the third phase, determining the derivative of the measured charging current with respect to time, and examining the derivative data over the second phase and/or the third phase to determine whether the derivative data presents a smooth curve or a curve with a local discontinuity. A smooth curve can indicate the absence of lithium plating and a curve with a local discontinuity can indicate the presence of lithium plating. The method can further include measuring the potential of a characteristic of the battery, determining the derivative of the measured potential with respect to time or charge, and examining the derivative data over the first phase, the third phase, and/or the fourth phase. The measured potential of a characteristic of the battery can comprise the anode potential, the cathode potential, and/or the cell potential. The measured potential of the characteristic of the battery can be IR compensated.

Methods for defining fast-charging profiles for a lithium batteries are provided. Batteries can include an anode, a cathode electrically connected to the anode via a circuit, and a lithium ion-containing electrolyte in contact with the anode and the cathode. Batteries can be charged by directing current from a power supply to the circuit. The methods can include during a three-phase, or optionally four-phase, calibration battery charging, charging the battery in a first phase at a near-maximum current until the battery anode potential substantially reaches a minimum anode potential threshold, subsequently in a second phase decreasing the charging current while charging the battery such that the anode potential remains substantially near, but not below, the minimum anode potential threshold, subsequently in a third phase charging the battery at a substantially constant cell potential and continuously decreasing the charging current such that cathode potential does not exceed a cathode potential threshold, measuring cell potential with respect to time during the first phase, the second phase, and the third phase, and measuring charging current with respect to time during the first phase, the second phase, and the third phase, and plotting the measured cell potential vs. the measured charging current to define a fast-charging profile. The method can further include determining the minimum anode potential threshold by first measuring the charging current during one or more of the second phase or the third phase, determining the derivative of the measured charging current with respect to time, and examining the derivative data over the second phase and/or the third phase to determine whether the derivative data presents a smooth curve or a curve with a local discontinuity, and second iteratively implementing the battery charging method using a higher anode potential threshold than the previous iteration if lithium plating occurred during the previous iteration or using a lower anode potential threshold than the previous iteration if no lithium plating occurred during the previous iteration. A smooth curve can indicate the absence of lithium plating and a curve with a local discontinuity can indicate the presence of lithium plating. The method can further include modifying the fast-charging profile by stair-stepping the data to charge at discreet, declining charging currents for successive periods of time. The battery can power an electric or hybrid vehicle. The method can further include measuring the potential of a characteristic of the battery, determining the derivative of the measured charging current with respect to time or charge, and examining the derivative data over the first phase, the third phase, and/or the fourth phase.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
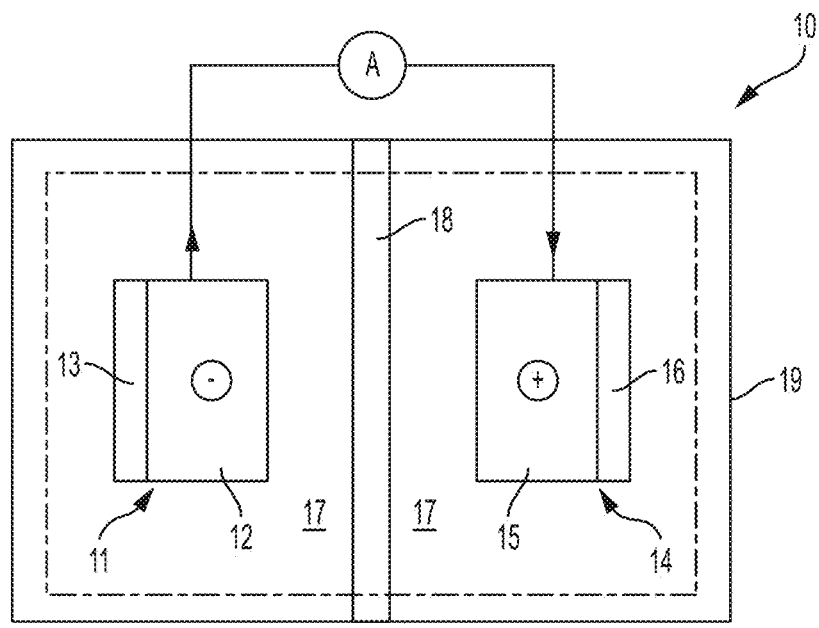
FIG. 1 illustrates a lithium battery cell, according to one or more embodiments.

FIG. 1 illustrates a lithium battery cell 10 comprising a negative electrode (i.e., the anode) 11, a positive electrode (i.e., the cathode) 14, an electrolyte 17 operatively disposed between the Anode 11 and the cathode 14, and a separator 18. Anode 11, cathode 14, and electrolyte 17 can be encapsulated in container 19, which can be a hard (e.g., metallic) case or soft (e.g., polymer) pouch, for example. The Anode 11 and cathode 14 are situated on opposite sides of separator 18 which can comprise a microporous polymer or other suitable material capable of conducting lithium ions and optionally electrolyte (i.e., liquid electrolyte). For example, the electrolyte can comprise a polymer or a liquid electrolytic solution. Liquid electrolytes 17 can include LiPF6, LiBF4, and LiClO4, among others, dissolved in a non-aqueous solvent. Polymer electrolytes 17 can include one or more polymers, such as polyethyleneoxide (PEO) or polyacrylonitrile, among others, and one or more lithium salts, such as LiPF6, LiBF4, LiClO4, LiSICON, or LiPON, among others. Anode 11 generally includes a current collector 12 and a lithium intercalation host material 13 applied thereto. Cathode 14 generally includes a current collector 15 and a lithium-based active material 16 applied thereto. In one example, anode 11 comprises lithium. In one embodiment, anode 11 comprises lithium and cathode 14 comprises sulfur. Active material 16 can store lithium ions at a higher electric potential than intercalation host material 13, for example. The current collectors 12 and 15 associated with the two electrodes are electrically connected by an external circuit A (e.g., an interruptible circuit) that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the anode 11 and cathode 14, respectively, and electrolyte 17.

Host material 13 can include any lithium host material that can sufficiently undergo lithium ion intercalation, deintercalation, and alloying, while functioning as the negative terminal of the lithium ion battery 10. Host material 13 can also include a polymer binder material to structurally hold the lithium host material together. For example, in one embodiment, host material 13 can include graphite intermingled in one or more of of polyvinyldiene fluoride (PVdF), an ethylene propylene diene monomer (EPDM) rubber, carboxymethoxyl cellulose (CMC), and styrene, 1,3-butadiene polymer (SBR). Graphite and carbon materials are widely utilized to form the negative electrode because it exhibits favorable lithium ion intercalation and deintercalation characteristics, is relatively non-reactive, and can store lithium ions in quantities that produce a relatively high energy density. Other materials can also be used to form the host material 13, for example, including one or more of lithium titanate, silicon, silicon oxide, tin, and tin oxide. Anode current collector 12 can include copper, aluminum, stainless steel, or any other appropriate electrically conductive material known to skilled artisans. Anode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others.

Active material 16 can include any lithium-based active material that can sufficiently undergo lithium intercalation and deintercalation while functioning as the positive terminal of battery cell 10. Active material 16 can also include a polymer binder material to structurally hold the lithium-based active material together. One common class of known materials that can be used to form active material 16 is layered lithium transitional metal oxides. For example, in various embodiments, active material 16 can comprise one or more of spinel lithium manganese oxide (LiMn2O4), lithium cobalt oxide (LiCoO2), a nickel-manganese-cobalt oxide [Li(NixMnyCoz)O2], or a lithium iron polyanion oxide such as lithium iron phosphate (LiFePO4) or lithium iron fluorophosphate (Li2FePO4F) intermingled in at least one of polyvinyldiene fluoride (PVdF), an ethylene propylene diene monomer (EPDM) rubber, carboxymethoxyl cellulose (CMC), and styrene, 1,3-butadiene polymer (SBR). Other lithium-based active materials can also be utilized besides those just mentioned. Those alternative materials include, but are not limited to, lithium nickel oxide (LiNiO2), lithium aluminum manganese oxide (LixAlyMn1−yO2), and lithium vanadium oxide (LiV2O5), to name but a few. Cathode current collector 15 can include aluminum or any other appropriate electrically conductive material known to skilled artisans, and can be formed in a foil or grid shape. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others.

Any appropriate electrolyte solution that can conduct lithium ions between Anode 11 and cathode 14 can be used in battery cell 10. In one embodiment, the electrolyte solution can be a non-aqueous liquid electrolyte solution that includes a lithium salt dissolved in an organic solvent or a mixture of organic solvents. Skilled artisans are aware of the many non-aqueous liquid electrolyte solutions that can be employed in battery cell 10 as well as how to manufacture or commercially acquire them. A non-limiting list of lithium salts that can be dissolved in an organic solvent to form the non-aqueous liquid electrolyte solution include LiClO4, LiAlCl4, LiI, LiBr, LiSCN, LiBF4, LiB(C6H5)4 LiAsF6, LiCF3SO3, LiN(CF3SO2)2, LiPF6, and mixtures thereof. These and other similar lithium salts can be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 18 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. Separator 18 can optionally be ceramic-coated with materials including one or more of ceramic type aluminum oxide (e.g., Al2O3), and lithiated zeolite-type oxides, among others. Lithiated zeolite-type oxides can enhance the safety and cycle life performance of lithium ion batteries, such as battery cell 10.

The microporous polymer separator 18 may be a single layer or a multi-layer laminate fabricated from either a dry or wet process. For example, in one embodiment, a single layer of the polyolefin may constitute the entirety of the microporous polymer separator 18. As another example, however, multiple discrete layers of similar or dissimilar polyolefins may be assembled into the microporous polymer separator 18. The microporous polymer separator 18 may also comprise other polymers in addition to the polyolefin such as, but not limited to, polyethylene terephthalate (PET), polyvinylidene fluoride (PVdF), and or a polyamide (Nylon). The polyolefin layer, and any other optional polymer layers, may further be included in the microporous polymer separator 18 as a fibrous layer to help provide the microporous polymer separator 18 with appropriate structural and porosity characteristics. Skilled artisans will undoubtedly know and understand the many available polymers and commercial products from which the microporous polymer separator 18 may be fabricated, as well as the many manufacturing methods that may be employed to produce the microporous polymer separator 18.

Lithium ion battery cell 10, or a battery module or pack comprising a plurality of battery cells 10 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Figure 2:
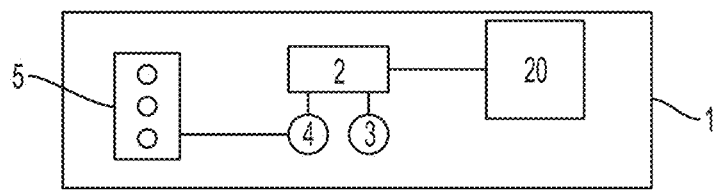
FIG. 2 illustrates a schematic diagram of a hybrid-electric vehicle, according to one or more embodiments.

FIG. 2 illustrates a schematic diagram of a hybrid-electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1. An engine 5 can be used to drive a generator 4, which in turn can provide energy to recharge the battery pack 20 via the inverter 2. External (e.g., grid) power can also be used to recharge the battery pack 20 via additional circuitry (not shown). Engine 5 can comprise a gasoline or diesel engine, for example.

Battery cell 10 generally operates by reversibly passing lithium ions between Anode 11 and cathode 14. Lithium ions move from cathode 14 to Anode 11 while charging, and move from Anode 11 to cathode 14 while discharging. At the beginning of a discharge, Anode 11 can contain a high concentration of intercalated lithium ions while cathode 14 is relatively depleted, and establishing a closed external circuit between Anode 11 and cathode 14 under such circumstances causes intercalated lithium ions to be extracted (i.e., de-intercalated) from Anode 11 (e.g., from host material 13). The extracted lithium atoms are split into lithium ions and electrons as they leave an intercalation host at an electrode-electrolyte interface. The lithium ions are carried through the micropores of separator 18 from Anode 11 to cathode 14 by the ionically conductive electrolyte 17 while, at the same time, the electrons are transmitted through the external circuit (e.g., to an external power-requiring circuit, such as electric motor 3) from Anode 11 to cathode 14 to balance the overall electrochemical cell. Electrons enter the cathode from the external circuit and facilitate the intercalation of lithium into active material 16. This flow of electrons through the external circuit can be harnessed and fed to a load device until the level of intercalated lithium in the negative electrode falls below a workable level or the need for power ceases.

A lithium battery (e.g., Battery cell 10 and/or battery pack 20) may be recharged after a partial or full discharge of its available capacity (e.g., in the event of a lithium-depleted anode 11). As shown in FIG. 1, the arrows indicate that current is flowing out of Anode 11 and into cathode 14, and thus battery cell 10 is shown in a charging state. To charge or re-power the lithium ion battery cell, an external power source (not shown) is connected to the positive and the negative electrodes to drive the reverse of battery discharge electrochemical reactions (i.e., reduction at anode 11 and oxidation at cathode 14). That is, during charging, the external power source extracts the lithium ions present in cathode 14 to produce lithium ions and electrons. The lithium ions are carried back through the separator by the electrolyte solution, and the electrons are driven back through the external circuit, both towards Anode 11. The lithium ions and electrons are ultimately reunited at the negative electrode, thus replenishing it with intercalated lithium for future battery cell discharge.

Specifically, during charging of a lithium cell, lithium ions are intercalated from electrolyte 17 onto the surfaces of host material 13. The lithium ions encounter electrons entering the host material 13 per the charging current and react with host material 13 to form an intercalation compound. Without being bound to a particular mechanism, Equation (1) provides an example mechanism by which an intercalation compound is formed for a host material 13 comprising graphite:

$$xLi+ + xe- + C_6 \rightarrow Li_xC_6 (0 \leq x \leq 1) \qquad (1)$$

Per Equation (1), six carbon atoms of the graphite crystal structure can accommodate up to one lithium atom in the intercalation process, driven by the applied charging potential. By this process, host material 13 is filled with (i.e., accommodates) lithium atoms at a reaction rate established by the environmental conditions at the anode site, the charging current, and other factors.

The continued capacity of a lithium battery (e.g., Battery cell 10 and/or battery pack 20), particularly during a large number of repeated charge-discharge cycles, depends in substantial measure on the effective movement of lithium into and out of the materials, often particulate materials, of the opposing electrodes. During battery charging not all lithium entering host material 13 may be accommodated to a suitable intercalated form (e.g., an LiC6 intercalation form for a host material 13 comprising graphite) and lithium plating may occur. In general, the ease with which lithium ions are reduced creates a risk of undesired lithium plating within lithium-based batteries. Specifically, lithium ions (e.g., Li+) may deposit as metallic lithium when the conditions are such that lithium ion reduction is preferential to lithium intercalation. In such cases, lithium ions collect an electron and lithium metal is undesirably plated within, proximate, or contiguous to anode 11 (e.g., on a surface of host material 13). For example, at high charging currents, the Li+ ion transport rate to an anode may exceed the rate at which Li+ ions can intercalate into the anode host material. This problem can be particular pronounced during fast charging with high current, charging at low ambient temperatures and slowed lithium ion movement, and regenerative breaking in vehicles (i.e., where energy is captured from vehicle breaking and used to charge an appurtenant battery, such as battery 20). Because plated lithium metal does not function in the same manner as intercalated lithium, lithium plating can exacerbate battery performance and degrade the battery's life and durability in a number of ways. In particular, the reduction of free lithium ions causes an irreversible electrical capacity loss within a battery cell, and non-homogeneous dendritic plating can exhibit a discrete electrochemical voltage potential which can interfere with the basic functions of the lithium-ion battery cell such as by causing short circuiting between two paired electrodes. Further, plated lithium can react with electrolyte 17 to yield inert Li-containing compounds incapable of participating in cell charge/discharge activity. In some instances, chemical interactions between plated lithium and electrolyte 17 can severe thermal events.

Provided herein are battery charging methods which increases battery charging (i.e., anode lithium intercalation) rates while minimizing or preventing lithium plating. Methods disclosed herein will be described in reference to the lithium batteries described above, however the disclosure is not intended to be limited thereby, and one of skill in the art will recognize that the methods disclosed herein are applicable to any battery susceptible to lithium or metal plating. The methods can be implemented by an electronic control module (ECM) of a vehicle, for example.

Figure 3:
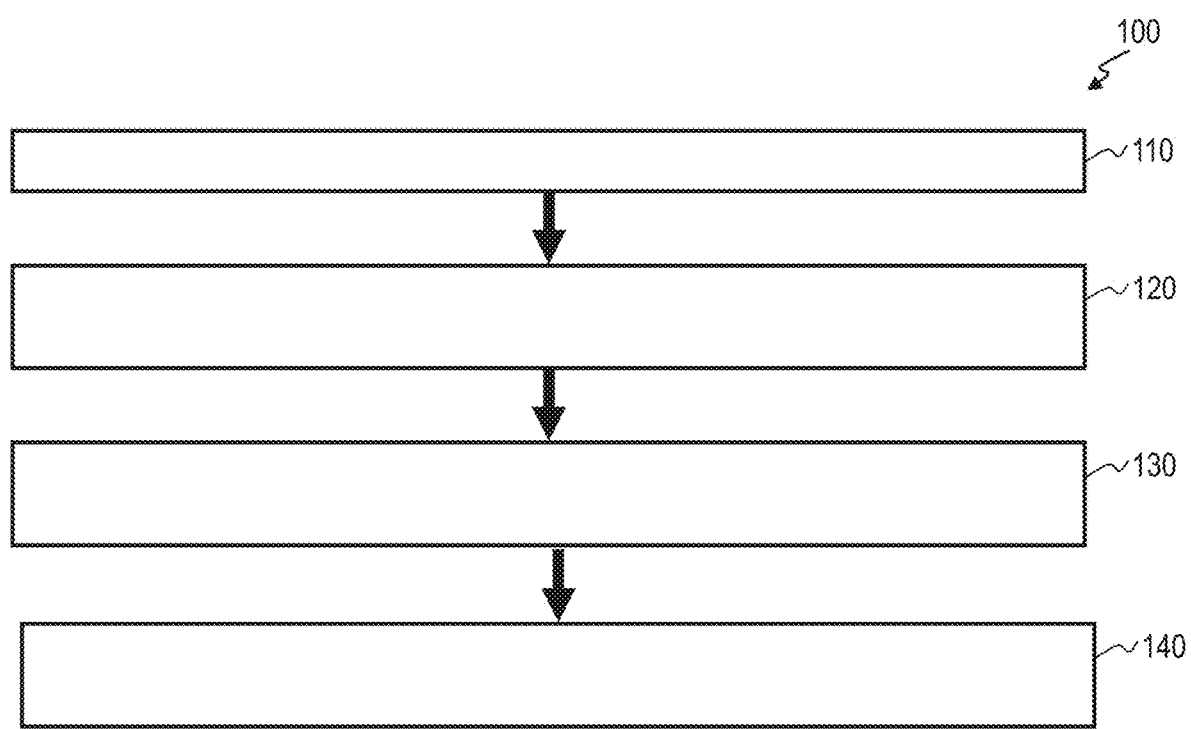
FIG. 3 illustrates a method for fast-charging a lithium battery, according to one or more embodiments.

FIG. 3 illustrates a method 100 for fast-charging a lithium battery, comprising charging 110 the battery in a first phase at a near-maximum charging current, subsequently charging 120 the battery in a second phase by decreasing the charging current while charging in order to maintain the anode potential equal to or above an anode potential threshold, and subsequently charging 130 the battery in a third phase such that the cathode potential remains below a cathode potential threshold. The battery can comprise at least one battery cell 10. While charging a battery, maximizing the charging current and/or minimizing the anode potential will reduce charging times. However, lithium plating occurs at the anode when the anode potential drops below the anode potential threshold. Accordingly, the battery is charged 110 during the first phase at a maximum or near-maximum charging current. A maximum charging current can be determined by the limitations of the battery hardware and/or the external charging hardware. Further, charging 110 during the first phase ends when the when the anode potential reaches or substantially reaches the anode potential threshold. If an IR-compensated anode potential is utilized, as described below, the IR-compensated anode potential would remain constant while the measured anode potential may vary. While charging 120 during the second phase, the anode potential is minimized without falling below the anode potential threshold. Accordingly, while charging 120 during the second phase, the anode potential remains substantially constant close to, but not below, the minimum anode potential threshold. Charging 120 during the second phase can end when the cell potential reaches or substantially reaches a cell potential threshold. The cell potential threshold can be a cell potential above which battery electrolyte irreversibly oxidizes, for example. While charging 130 during the third phase, the cell potential can be substantially constant. While charging 130 during the third phase, the charging current can be decreased such that the cathode potential remains close to, but not above, the cathode potential threshold. Method 100 can optionally further comprise ending battery charging 140 and maintaining the battery in an open-circuit state during a fourth phase. Ending battery charging 140 can occur when the charging current reaches a minimum value. The minimum value can be predefined, can be determined when the charging current reaches a lower asymptote, or can be defined by the point at which the battery charge is suitable (e.g., the battery has enough charge to power a vehicle for a desired range).

Figure 4:
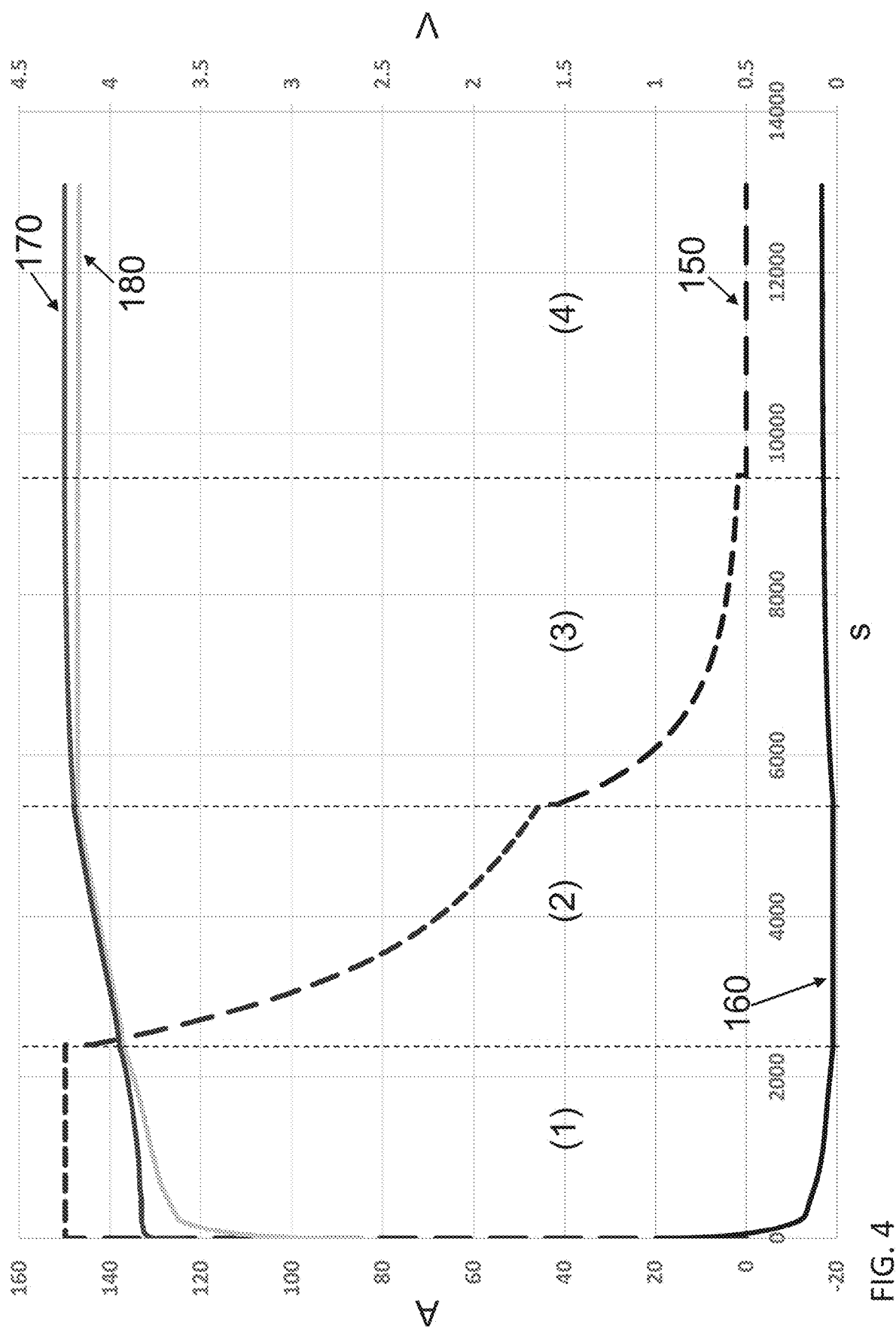
FIG. 4 illustrates a illustrates a graph of lithium battery data collected during fast-charging of the battery, according to one or more embodiments.

FIG. 4 illustrates a graph of battery data collected during the implementation of method 100 (i.e., during the first phase (1), the second phase (2), the third phase (3) and the optional fourth phase (4)). FIG. 4 illustrates charging current 150 (in Amperes) with respect to time (in seconds). FIG. 4 also illustrates anode potential 160 (in Volts), cathode potential 170 (in Volts), and cell potential 180 (in Volts) with respect to time (in seconds).

Figure 5:
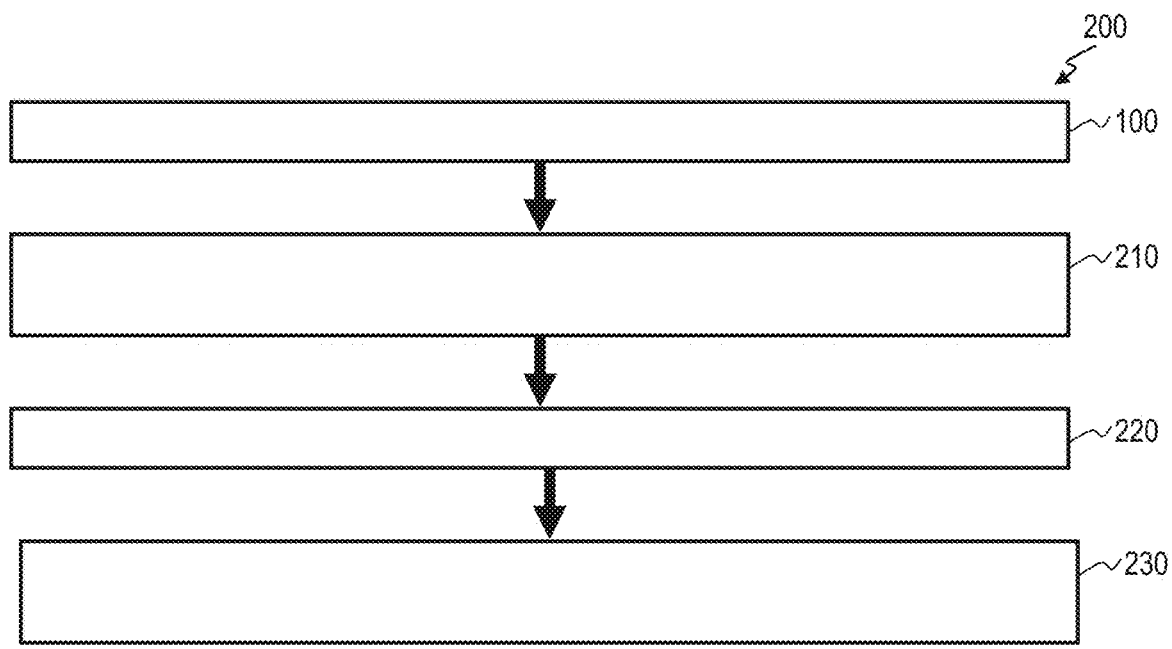
FIG. 5 illustrates a method for determining whether lithium plating occurs during the charging of a lithium battery, according to one or more embodiments.

In order to achieve a fast charge, anode potential should be minimized during the second phase (2), but must not be lower than the anode potential threshold below which lithium plating occurs. A method 200 for determining whether lithium plating occurs during the charging of a battery is illustrated in FIG. 5. Method 200 comprises at least partially implementing method 100 with a prescribed anode potential threshold, measuring 210 the charging current and/or the potential (i.e., the voltage) of a characteristic of the battery during implementation of method 100, determining 220 the derivative of the measured 210 charging current and/or potential with respect to time or charge (Q), and examining 230 the derivative data to determine whether the derivative data presents a smooth curve or a curve with a local discontinuity. In one embodiment at least partially implementing method 100 can comprise implementing phase 1. In one embodiment at least partially implementing method 100 can comprise implementing phase 1 and subsequently phase 4. In one embodiment at least partially implementing method 100 can comprise implementing phase 1 and subsequently implementing phase 2 and/or phase 3. In one embodiment at least partially implementing method 100 can comprise implementing phase 1, subsequently implementing phase 2 and/or phase 3, and subsequently implementing phase 4. A smooth curve can indicate the absence of lithium plating and a curve with a local discontinuity can indicate the presence of lithium plating. A local discontinuity can comprise an inflection point in the first derivative, a zero crossing in the second derivative, or a flat portion. The derivative determined 220 can be a first derivative and/or a second derivative. In some embodiments, measuring 210 comprises only measuring charging current and determining 220 comprises only determining the derivative of the measured 210 charging current. In some embodiments, measuring 210 comprises measuring charging current and optionally measuring the potential of a characteristic of the battery, and determining 220 comprises determining the derivative of the measured 210 charging current and optionally determining the derivative of the measured 210 potential of a characteristic of the battery.

Figure 6:
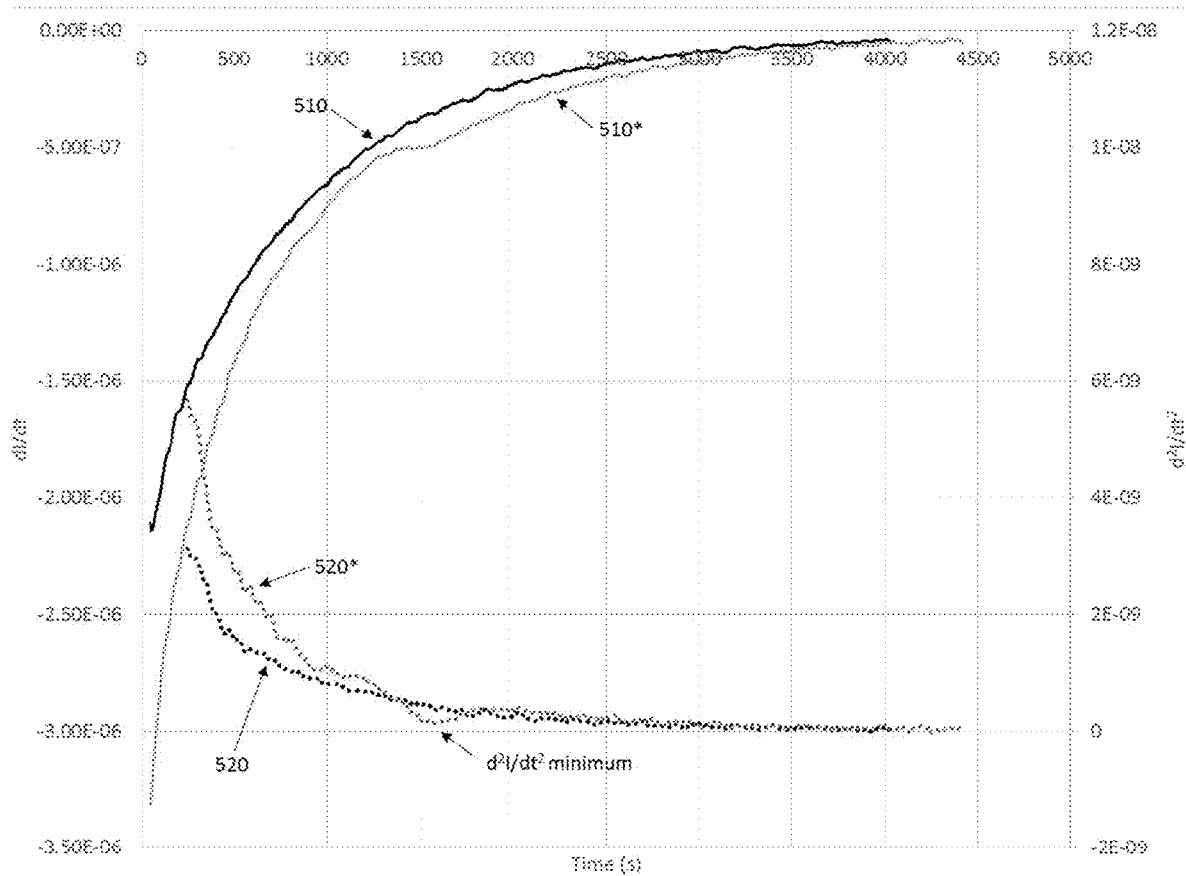
FIG. 6 illustrates a graph of lithium battery data collected during fast-charging of the battery, according to one or more embodiments.

In some embodiments, determining 220 the derivative of the measured 210 charging current with respect to time or charge (Q) can comprises determining the derivative of the measured charging current during phase 2 and/or phase 3 with respect to time. For example, FIG. 6 illustrates a graph of battery data collected during phase 3 of a battery charged in accordance with method 100. FIG. 6 shows the first derivative of charging current 510 with respect to time (in seconds) (dI/dt), and the second derivative of charging current 520 with respect to time (in seconds) ($d^2I/dt^2$) for a battery charged using a prescribed 20 mV anode potential threshold; this data indicates an absence of lithium plating. FIG. 6 also shows the first derivative of charging current 510* with respect to time (in seconds) (dI/dt), and the second derivative of charging current 520* with respect to time (in seconds) ($d^2I/dt^2$) for a battery charged using a prescribed 10 mV anode potential threshold; this data indicates the presence of lithium plating. In particular, a flat non-continuity can be observed in the first derivative of charging current 510* (dI/dt) at about 1,500 seconds, and a local minimum can be observed in the second derivative of charging current 520* ($d^2I/dt^2$) at about 1,500 seconds.

Method 200 can comprise measuring 210 the potential of a characteristic of the battery, determining 220 the derivative of the measured potential with respect to time or charge, and examining 230 the derivative data over the first phase, the third phase, and/or the fourth phase. The measured 210 potential of a characteristic of the battery can comprise the anode potential ($V_{anode}$), the cathode potential ($V_{cathode}$), and/or the cell potential ($V_{cell}$). In one embodiment, determining 220 the derivative of the measured 210 potential with respect to time or charge can comprise determining the derivatives(s) of $V_{anode}$ during phase 1 and/or phase 3 with respect to charge. In one embodiment, determining 220 the derivative of the measured 210 potential with respect to time or charge can comprise determining the derivatives(s) of $V_{anode}$ and/or $V_{cell}$ during phase 4 with respect to time.

The measured potential of the characteristic of the battery can be IR compensated. IR-compensation removes from the measured potential any partial potential(s) of one or more components which do indicate lithium plating. Electronic resistance of conductors within a battery (e.g., metallic foils, tabs, busbars, etc.) and the host material and active material of respective electrodes, among others, may not influence or otherwise indicate the likelihood or occurrence of lithium plating. The potential drop across such resistors can be assessed and removed from the total measured potential so as isolate and identify the state of anode polarization with respect to factors (e.g., reaction kinetics and mass transport gradients) that directly indicate or relate to lithium plating. IR-compensation can be accomplished by current interrupt measurement, analysis of cell AC impedance data, and by model parameter estimation, among other means.

Figure 7:
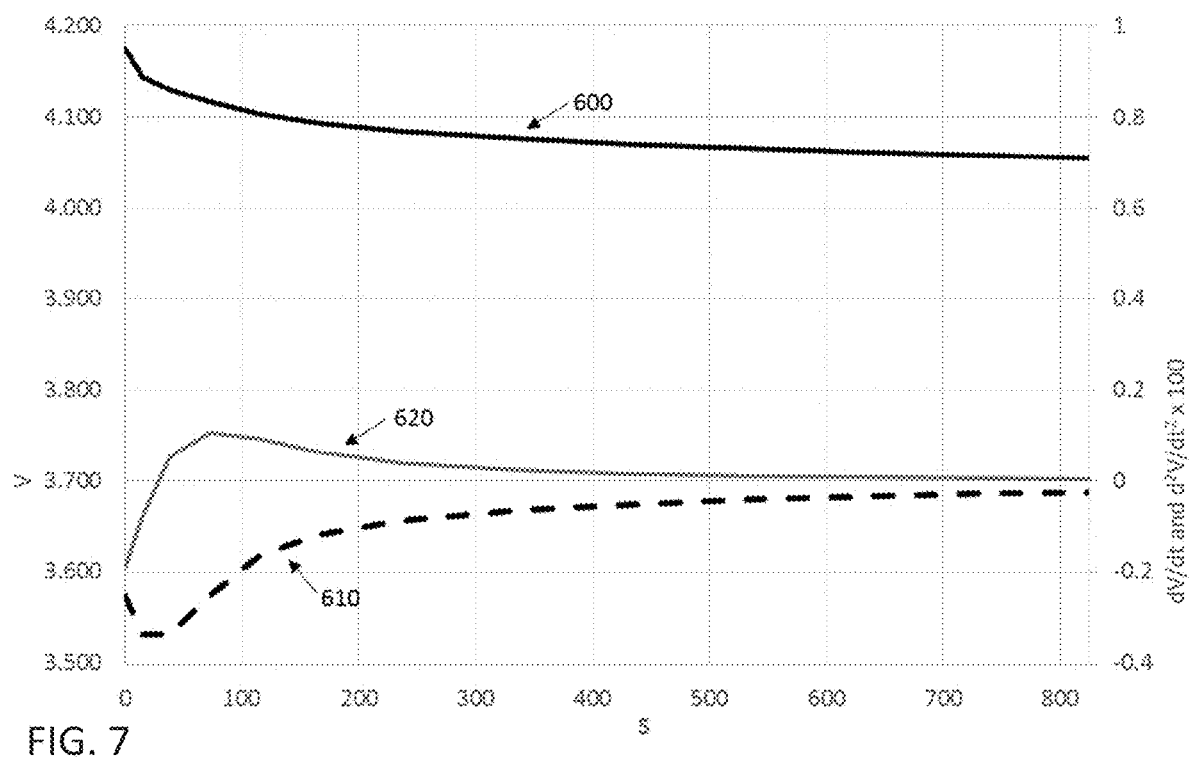
FIG. 7 illustrates a graph of lithium battery data collected during fast-charging of the battery, according to one or more embodiments.
Figure 8:
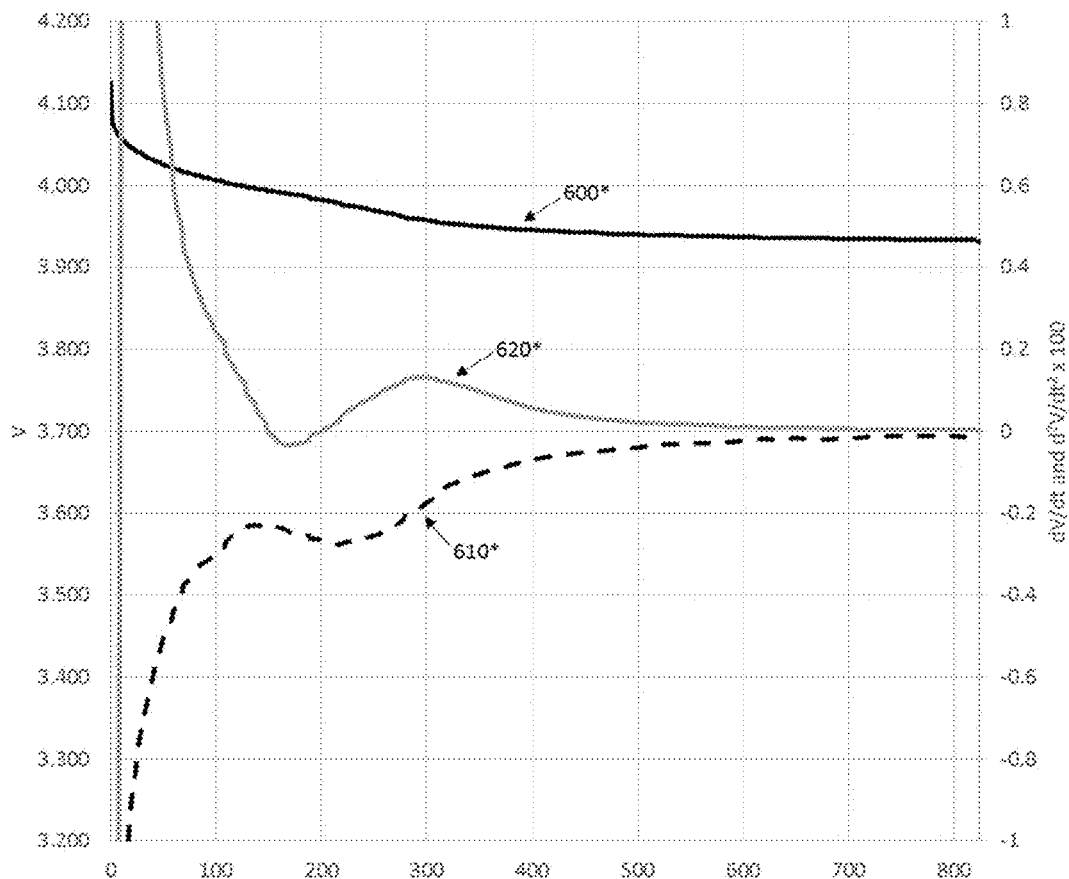
FIG. 8 illustrates a graph of lithium battery data collected during fast-charging of the battery, according to one or more embodiments.

FIG. 7 illustrates a graph of battery data collected during phase (1) of a battery charged at least partially in accordance with method 100 which indicates the absence of lithium plating. In particular, after charging in phase 1, the battery subsequently assumed a rest phase (i.e., phase 4). FIG. 7 shows cell potential 600 (in Volts), the first derivative of cell potential 610 with respect to time (in seconds) (dV/dt), and the second derivative of cell potential 620 with respect to time (in seconds) $(d^2V/dt^2)*100$. Similarly, FIG. 8 illustrates a graph of battery data collected during phase (1) of a battery charged at least partially in accordance with method 100 which indicates the presence of lithium plating. In particular, after charging in phase 1, the battery subsequently assumed a rest phase (i.e., phase 4). FIG. 8 shows cell potential 600 (in Volts), the first derivative of cell potential 610 with respect to time (in seconds) (dV/dt), and the second derivative of cell potential 620 with respect to time (in seconds) $(d^2V/dt^2)*100$.

Returning to method 100, the anode potential threshold can be determined by iteratively utilizing method 200. In particular, if method 200 is implemented at a prescribed anode potential threshold and indicates lithium plating, method 200 can be subsequently implemented using a higher anode potential threshold to reduce or eliminate lithium plating. Similarly, if method 200 is implemented at a prescribed anode potential threshold and indicates no lithium plating, method 200 can be subsequently implemented using a lower anode potential threshold to increase charging speed.

Figure 9:
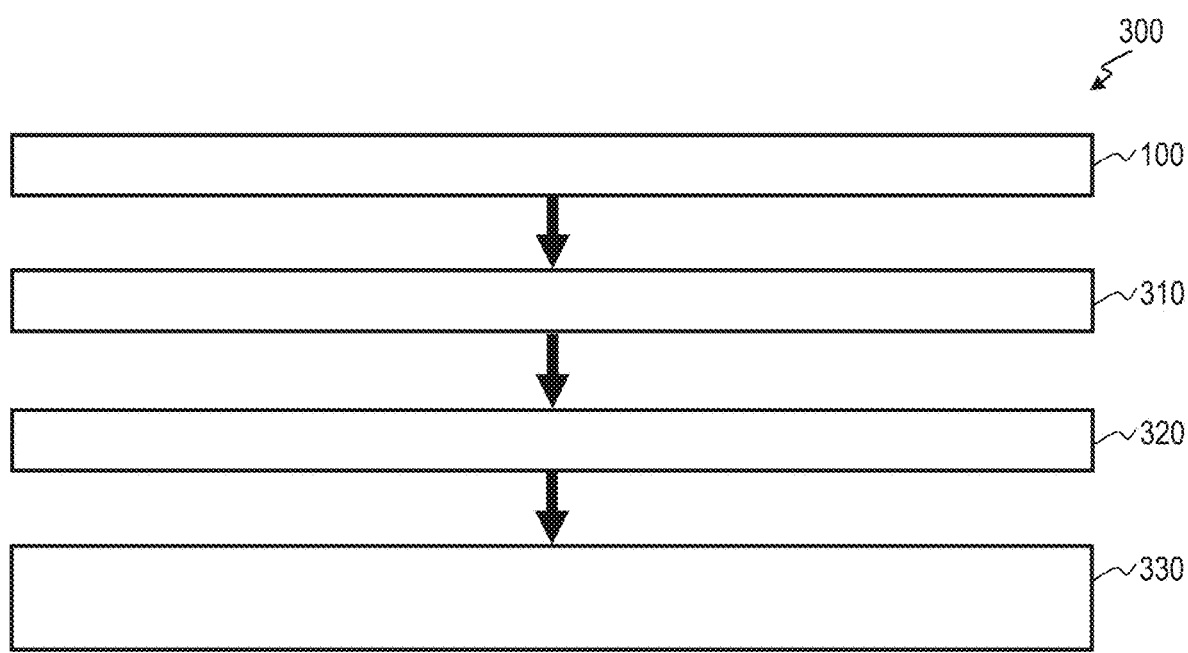
FIG. 9 illustrates a method for defining a fast-charging profile for a lithium battery, according to one or more embodiments.
Figure 10:
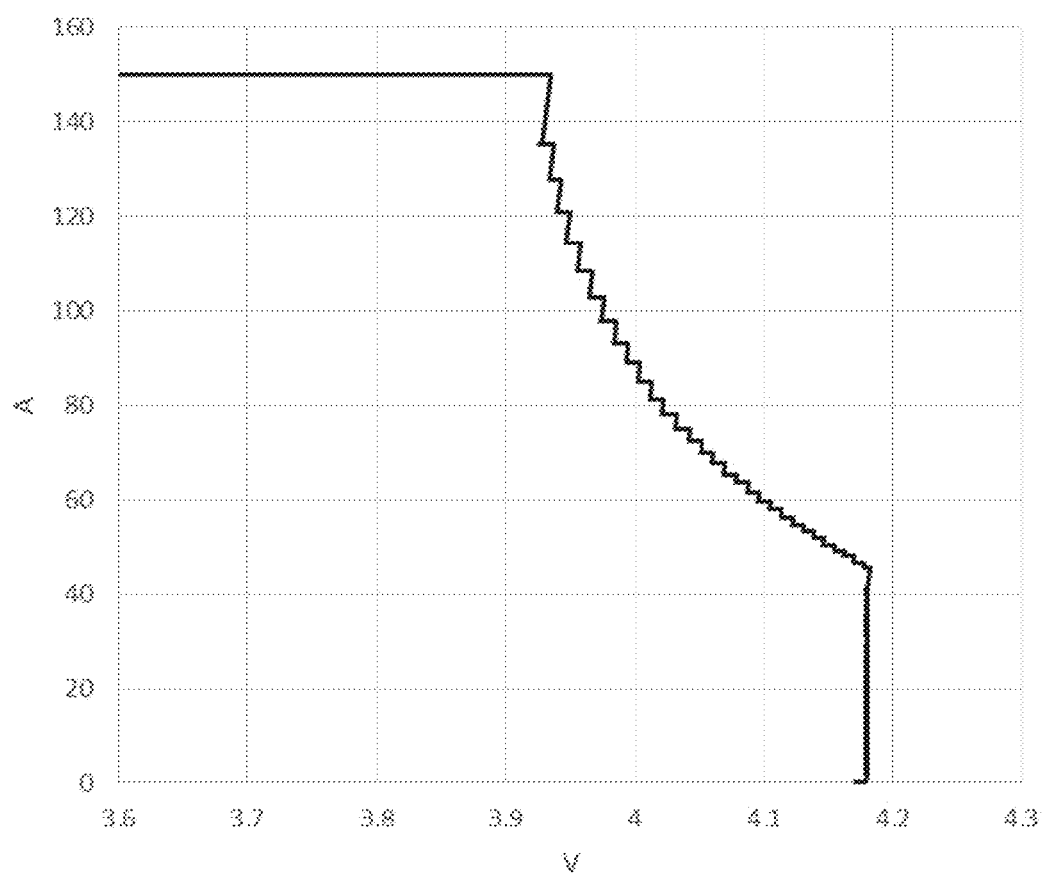
FIG. 10 illustrates a fast-charging profile for a lithium battery, according to one or more embodiments.

While many battery parameters can be controlled and/or monitored in a testing environment, it is only possible to monitor certain characteristics of commercial batteries (e.g., cell potential for batteries powering electric vehicles or hybrid electric vehicles) and some battery charging facilities (e.g., battery charging stations for electric vehicles or hybrid electric vehicles) can only control charging current. Accordingly, a method 300 for defining a fast-charging profile for a lithium battery is illustrated in FIG. 9. Method 300 comprises implementing method 100, measuring 310 cell potential with respect to time during the first phase, the second phase, and the third phase (i.e., while charging); measuring 320 charging current with respect to time during the first phase, the second phase, and the third phase (i.e., while charging); and plotting 330 the measured cell potential vs. the measured charging current to define a fast-charging profile. The fast charging profile can be modified to charge at discreet, declining charging currents for successive periods (of time i.e., stair step) in order to accommodate charging equipment, for example. FIG. 10 illustrates a fast-charging profile for a lithium battery developed using method 300. FIG. 10 illustrates a stair-step-modified fast charging profile.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The invention claimed is:

1. Method for fast-charging a lithium battery, wherein the lithium battery comprises an anode, a cathode electrically connected to the anode via a circuit, and a lithium ion-containing electrolyte in contact with the anode and the cathode, and wherein the lithium battery is charged by directing current from a power supply to the circuit, the method comprising:
   charging the lithium battery in a first phase by maximizing a charging current to an extent determined by the limitations of the lithium battery hardware and/or hardware of an external charger;
   subsequently charging the lithium battery in a second phase by decreasing the charging current while charging in order to maintain the anode potential equal to or above an anode potential threshold, wherein the minimum anode potential threshold is an anode voltage below which lithium plating occurs during charging; and
   subsequently charging the lithium battery in a third phase such that a cell potential remains below a maximum cell potential threshold, wherein the cell potential threshold is the cell voltage above which the electrolyte irreversibly oxidizes.

2. The method of claim 1, wherein during the second phase the anode potential remains substantially constant close to, but not below, the minimum anode potential threshold.

3. The method of claim 1, wherein the first phase ends when the anode potential reaches the anode potential threshold.

4. The method of claim 1, wherein the second phase ends when the cell potential reaches a maximum cell potential threshold.

5. The method of claim 1, wherein the cell potential remains substantially constant during the third phase.

6. The method of claim 1, wherein the charging current is decreased while charging during the third phase such that the cell potential remains close to, but not above, the maximum cell potential threshold.

7. The method of claim 1, further comprising subsequently ending battery charging when the charging current reaches a minimum value and maintaining the lithium battery in an open-circuit state in a fourth phase.

8. The method of claim 1, further comprising determining the minimum anode potential threshold by, in a first step:
   measuring the charging current during one or more of the second phase or the third phase;
   determining the derivative of the measured charging current with respect to time; and
   examining the derivative data over the second phase and/or the third phase to determine whether the derivative data presents a smooth curve or a curve with a local discontinuity, wherein a smooth curve indicates the absence of lithium plating and a curve with a local discontinuity indicates the presence of lithium plating; and
   in a second step:
   iteratively implementing the first step using a higher minimum anode potential threshold than the previous iteration if lithium plating occurred during the previous iteration or using a lower minimum anode potential threshold than the previous iteration if no lithium plating occurred during the previous iteration.

9. The method of claim 8, further comprising measuring the potential of a characteristic of the lithium battery, determining the derivative of the measured potential with respect to time or charge, and examining the derivative data over the first phase, the third phase, and/or the fourth phase.

10. The method of claim 9, wherein the measured potential of a characteristic of the lithium battery comprises one or more of the anode potential, a cathode potential, and/or the cell potential.

\* \* \* \* \*